(12) United States Patent
Bennett et al.

(10) Patent No.: US 6,803,432 B2
(45) Date of Patent: Oct. 12, 2004

(54) COPOLYMERIZATION OF OLEFINS

(75) Inventors: Alison Margaret Anne Bennett, Wilmington, DE (US); Jerald Feldman, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/251,041

(22) Filed: Sep. 20, 2002

(65) Prior Publication Data

US 2003/0114610 A1 Jun. 19, 2003

Related U.S. Application Data

(63) Continuation of application No. 09/946,170, filed on Sep. 4, 2001, now abandoned, which is a continuation of application No. 09/317,563, filed on May 24, 1999, now abandoned.
(60) Provisional application No. 60/087,152, filed on May 29, 1998.

(51) Int. Cl.[7] ............................ C08F 4/602; C08F 4/603
(52) U.S. Cl. .................... 526/161; 526/169.1; 526/171; 526/172; 526/134
(58) Field of Search ................................ 526/161, 172, 526/169.1, 171, 134

(56) References Cited

U.S. PATENT DOCUMENTS 4,367,322 A      1/1983   Shiga et al.
5,866,665 A      2/1999   Shaffer et al.
5,955,555 A   *  9/1999   Bennett ..................... 526/133
6,150,482 A   * 11/2000   Brookhart et al. .......... 526/161
6,451,939 B1  *  9/2002   Britovsek et al. .......... 502/155

FOREIGN PATENT DOCUMENTS

| EP | 0 824 111 A1 | 2/1998 |
| WO | WO 98/27124 | 6/1998 |
| WO | WO 98/30612 | 7/1998 |
| WO | WO 98/38228 | 9/1998 |
| WO | WO 99/12981 | 3/1999 |

OTHER PUBLICATIONS

Brooke L. Small, et al. Highly Active Iron and Cobalt Catalysts for the Polymerization of Ethylene, *J. Am. Chem. Soc.*, 120, 4049–4050, 1998.

George J. P. Britovsek, et al., Novel olefin polymerization catalysts based on iron and cobalt, *Chem. Commun.*, 849–850, 1998.

Invitation to Pay Additional Fees with Communication Relating to the results of the Partial International Search (Annex to Form PCT/ISA/206) dated Nov. 15, 1999.

* cited by examiner

*Primary Examiner*—Roberto Rabago

(57) ABSTRACT

Ethylene and/or propylene, and α-olefins may be copolymerized by contacting then with certain iron or cobalt complexes of selected 2,6-pyridinecarboxaldehydebis (imines) and 2,6-diacylpyridinebis(imines). The polymers produced, some of which are novel, are useful as molding resins.

22 Claims, No Drawings

COPOLYMERIZATION OF OLEFINS

This application is a continuation of application Ser. No. 09/946,170, filed Sep. 4, 2001, now abandoned, which is a continuation of application Ser. No. 09/317,563, filed May 24, 1999, now abandoned, which claims benefit of application Ser. No. 60/087,152, filed May 29, 1998.

FIELD OF THE INVENTION

Selected iron and cobalt complexes of 2,6-pyridinecarboxaldehydebis(imines) and 2,6-diacylpyridinebis(imines) are catalysts for the copolymerization of ethylene and/or propylene and α-olefins. Novel polymers may be produced.

FIELD OF THE INVENTION

Copolymers of ethylene and/or propylene and α-olefins, such as linear low density polyethylene (LLDPE) are important items of commerce, millions of tons being produced annually. These polymers are used in a myriad of ways, such as for fiber, films, molding resins, etc. In most cases, ethylene and α-olefins are copolymerized using a catalyst, often a transition metal compound or complex. These catalysts may vary in cost per unit weight of polymer produced, the structure of the polymer produced, the possible need to remove the catalyst from the polymer, the toxicity of the catalyst, etc. Due to the commercial importance of copolymerizing ethylene, new polymerization catalysts are constantly being sought.

B. L. Small, et al., J. Am. Chem. Soc., vol. 120, p. 4049–4050 (1998), and G. J. P. Britovsek, et al., J. Chem. Soc., Chem. Commun., p. 849–850 (1998) report the polymerization of ethylene using catalysts containing Fe or Co complexes of 2,6-pyridinecarboxaldehydebis(imines) and 2,6-diacylpyridinebis(imines). Copolymerization of α-olefins and ethylene are not reported.

SUMMARY OF THE INVENTION

This invention concerns a first polymerization process, comprising, contacting, at a temperature of about −100° C. to about +200° C., a compound of the formula:

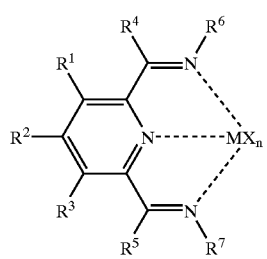

(II)

with one or both of ethylene and propylene, and an olefin of the formula $H_2C=CHR^{21}$ and:

(a) a first compound W, which is a neutral Lewis acid capable of abstracting $X^-$ an alkyl group or a hydride group from M to form $WX^-$, $(WR^{20})^-$ or $WH^-$ and which is also capable of transferring an alkyl group or a hydride to M, provided that $WX^-$ is a weakly coordinating anion; or (b) a combination of second compound which is capable of transferring an alkyl or hydride group to M and a third compound which is a neutral Lewis acid which is capable of abstracting $X^-$, a hydride or an alkyl group from M to form a weakly coordinating anion;

wherein:

M is Co or Fe;

each X is an anion;

n is 1, 2 or 3 so that the total number of negative charges on said anion or anions is equal to the oxidation state of a Fe or Co atom present in (II);

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl;

$R^6$ and $R^7$ are aryl or substituted aryl;

$R^{20}$ is alkyl; and $R^{21}$ is alkyl.

This invention also concerns a second polymerization process, comprising contacting, at a temperature of about −100° C. to about +200° C., a Co[II], Co[III], Fe[II] or Fe[III] complex of a tridentate ligand of the formula:

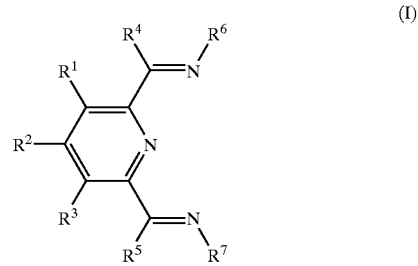

(I)

with one or both of ethylene and propylene, and an olefin of the formula $H_2C=CHR^{21}$ wherein:

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl; and $R^6$ and $R^7$ are aryl or substituted aryl;

$R^{21}$ is alkyl;

and provided that a Co[II], Co[III], Fe[II] or Fe[III] atom also has bonded to it an empty coordination site or a ligand that may be displaced by said ethylene, and a ligand that may add to said ethylene.

This invention also concerns a third polymerization process, comprising, contacting, at a temperature of about −100° C. to about +200° C., one or both of ethylene and propylene, an olefin of the formula $H_2C=CHR^{21}$, and a compound of the formula:

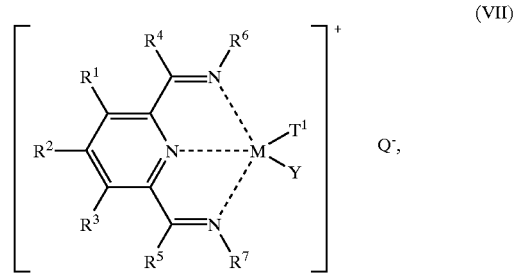

(VII)

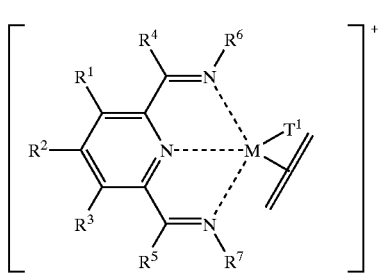

(XII)

(IX)

wherein:

M is Co or Fe;

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl; and $R^6$ and $R^7$ are aryl or substituted aryl;

$R^{21}$ is alkyl;

$T^1$ is hydride or alkyl or any other anionic ligand into which ethylene or an α-olefin can insert;

Y is a neutral ligand capable of being displaced by ethylene or a vacant coordination site;

Q is a relatively non-coordinating anion;

P is a divalent polyolefin group; and $T^2$ is an end group.

DETAILS OF THE INVENTION

Herein, certain terms are used. Some of them are:

A "hydrocarbyl group" is a univalent group containing only carbon and hydrogen. If not otherwise stated, it is preferred that hydrocarbyl groups herein contain 1 to about 30 carbon atoms.

By "substituted hydrocarbyl" herein is meant a hydrocarbyl group which contains one or more substituent groups which are inert under the process conditions to which the compound containing these groups is subjected. The substituent groups also do not substantially interfere with the process. If not otherwise stated, it is preferred that substituted hydrocarbyl groups herein contain 1 to about 30 carbon atoms. Included in the meaning of "substituted" are heteroaromatic rings. All of the hydrogen atoms may be substituted for, as in trifluoromethyl.

By "(inert) functional group" herein is meant a group other than hydrocarbyl or substituted hydrocarbyl which is inert under the process conditions to which the compound containing the group is subjected. The functional groups also do not substantially interfere with any process described herein that the compound in which they are present may take part in. Examples of functional groups include halo (fluoro, chloro, bromo and iodo), ether such as —$OR^{18}$ wherein $R^{18}$ is hydrocarbyl or substituted hydrocarbyl. In cases in which the functional group may be near a cobalt or iron atom, such as $R^4$ and $R^5$, the functional group should not coordinate to the metal atom more strongly than the groups in compounds containing $R^4$ and $R^5$, which are shown as coordinating to the metal atom, that is they should not displace the desired coordinating group.

By an "alkyl aluminum compound" is meant a compound in which at least one alkyl group is bound to an aluminum atom. Other groups such as alkoxide, hydride, and halogen may also be bound to aluminum atoms in the compound.

By "neutral Lewis base" is meant a compound, which is not an ion, which can act as a Lewis base. Examples of such compounds include ethers, amines, sulfides, and organic nitriles.

By "cationic Lewis acid" is meant a cation which can act as a Lewis acid. Examples of such cations are sodium and silver cations.

By relatively noncoordinating (or weakly coordinating) anions are meant those anions as are generally referred to in the art in this manner, and the coordinating ability of such anions is known and has been discussed in the literature, see for instance W. Beck., et al., Chem. Rev., vol. 88 p. 1405–1421 (1988), and S. H. Stares, Chem. Rev., vol. 93, p. 927–942 (1993), both of which are hereby included by reference. Among such anions are those formed from the aluminum compounds in the immediately preceding paragraph and $X^-$, including $R^9{}_3AlX^-$, $R^9{}_2AlClX^-$, $R^9AlCl_2X^-$, and "$R^9AlOX^-$", wherein $R^9$ is alkyl. Other useful noncoordinating anions include $BAF^-$ ($BAF$=tetrakis[3,5-bis(trifluoromethyl)phenyl]borate), $SbF_6{}^-$, $PF_6{}^-$, and $BF_4{}^-$, trifluoromethanesulfonate, p-toluenesulfonate, $(R_fSO_2)_2N^-$, and $(C_6F_5)_4B^-$.

By an empty coordination site is meant a potential coordination site that does not have a ligand bound to it. Thus if an ethylene molecule is in the proximity of the empty coordination site, the ethylene or other olefin molecule may coordinate to the metal atom.

By a "divalent polyolefin group" is meant a group -Z- which contains one or more ethylene and/or α-olefin repeat units.

By a ligand that may add to ethylene, propylene, or an α-olefin is meant a ligand coordinated to a metal atom into which an ethylene molecule (or a coordinated ethylene molecule) may insert to start or continue a polymerization. For instance, this may take the form of the reaction (wherein L is a ligand):

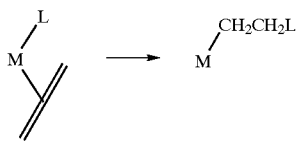

Note the similarity of the structure on the left-hand side of this equation to compound (IX) (see below).

Compounds useful as ligands herein in iron and cobalt complexes are diimines of 2,6-pyridinedicarboxaldehyde or 2,6-diacylpyridines of the general formula:

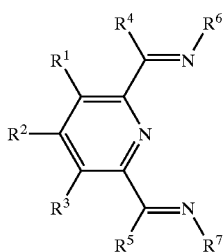

wherein $R^1$, $R^2$ and $R^3$ are each independently hydrogen, hydrocarbyl, substituted hydrocarbyl, or an inert functional group, $R^4$ and $R^5$ are each independently hydrogen, hydrocarbyl, an inert functional group or substituted hydrocarbyl, and $R^6$ and $R^7$ are aryl or substituted aryl.

(IV) may be made by the reaction of a compound of the formula:

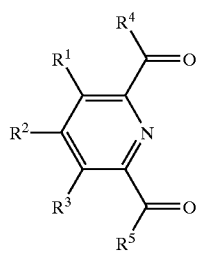

with a compound of the formula $H_2NR^6$ or $H_2NR^7$, wherein $R^1$, $R^2$ and $R^3$ are each independently hydrogen, hydrocarbyl, substituted hydrocarbyl, or an inert functional group, $R^4$ and $R^5$ are each independently hydrogen, hydrocarbyl or substituted hydrocarbyl, $R^4$ and $R^5$ are each hydrocarbyl or substituted hydrocarbyl, and $R^6$ and $R^7$ are aryl or substituted aryl. These reactions are often catalyzed by carboxylic acids, such as formic acid.

Preferred compounds of formula (IV) and compounds in which (IV) is a ligand are those of compound (III): [note

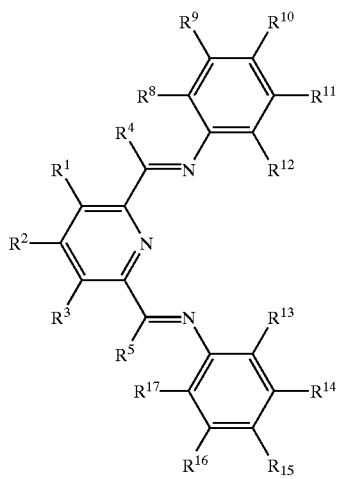

that (III) is a subset of (IV)], whether present in compounds such as (I), (II), (IV), (VII), (IX) and (XII). In (III), and hence in (I), (II), (IV) (VII), (IX) and (XII) that match the formula of (III), it is preferred that:

$R^1$, $R^2$ and $R^3$ are hydrogen; and/or $R^1$ and $R^3$ are hydrogen and $R^2$ is trifluoromethyl; and/or $R^9$, $R^{10}$, $R^{11}$, $R^{14}$, $R^{15}$ and $R^{16}$ is each independently halogen, alkyl containing 1 to 6 carbon atoms, or hydrogen, and it is more preferred that each of these is hydrogen; and/or $R^{10}$ and $R^{15}$ are methyl; and/or $R^8$ and $R^{13}$ is each independently halogen, phenyl or alkyl containing 1 to 6 carbon atoms, and it is especially preferred that each $R^8$ and $R^{13}$ is alkyl containing 1–6 carbon atoms and is more preferred that $R^8$ and $R^{13}$ are methyl; and/or $R^{12}$ and $R^{17}$ is each independently halogen, phenyl, hydrogen, or alkyl containing 1 to 6 carbon atoms, and it is especially preferred that each $R^{12}$ and $R^{17}$ is alkyl containing 1–6 carbon atoms, and it is more preferred that $R^{12}$ and $R^{17}$ are methyl; and/or $R^4$ and $R^5$ are each independently halogen, thioalkyl, hydrogen or alkyl containing 1 to 6 carbon atoms, and it is especially preferred that $R^4$ and $R^5$ are each independently hydrogen or methyl; and/or $R^8$, $R^{10}$, $R^{13}$, $R^{15}$ and $R^{17}$ are hydrogen, and $R^9$, $R^{11}$, $R^{14}$ and $R^{16}$ are hydrocarbyl or substituted hydrocarbyl.

Also in (III), and hence in (I), (II), (IV) (VII), (IX) and (XII) that match the formula of (III), it is preferred that:

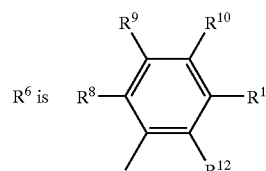

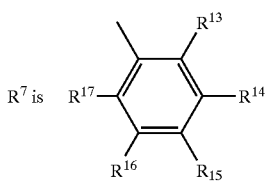

$R^8$ and $R^{13}$ are each independently hydrogen, hydrocarbyl, substituted hydrocarbyl or an inert functional group;

$R^9$, $R^{10}$, $R^{11}$, $R^{14}$, $R^{15}$ and $R^{16}$ are each independently hydrogen, hydrocarbyl, substituted hydrocarbyl or an inert functional group;

$R^{12}$ and $R^{17}$ are each independently hydrogen, hydrocarbyl, substituted hydrocarbyl or an inert functional group;

and provided that any two of $R^8$, $R^9$, $R^{10}$, $R^{11}$, $R^{12}$, $R^{13}$, $R^{14}$, $R^{15}$, $R^{16}$ and $R^{17}$ that are vicinal to one another, taken together may form a ring.

Specific preferred compounds (III) [and also in (I), (II), (IV), (VII), (IX) and (XII)] are:

$R^1$, $R^2$, $R^3$, $R^9$, $R^{11}$, $R^{14}$, and $R^{16}$ are hydrogen, and $R^4$, $R^5$, $R^8$, $R^{10}$, $R^{12}$, $R^{13}$, $R^{15}$ and $R^{17}$ are methyl;

$R^1$, $R^2$, $R^3$, $R^9$, $R^{10}$, $R^{11}$, $R^{14}$, $R^{15}$ and $R^{16}$ are hydrogen, $R^8$ and $R^{13}$ are chloro, and $R^4$, $R^5$, $R^{12}$ and $R^{17}$ are methyl;

$R^1$, $R^2$, $R^3$, $R^9$, $R^{10}$, $R^{11}$, $R^{12}$, $R^{14}$, $R^{15}$, $R^{16}$ and $R^{17}$ are hydrogen, $R^4$ and $R^5$ are methyl, and $R^8$ and $R^{13}$ are phenyl;

$R^1$, $R^2$, $R^3$, $R^4$, $R^5$, $R^9$, $R^{10}$, $R^{11}$, $R^{14}$, $R^{15}$, and $R^{16}$ are hydrogen, and $R^8$, $R^{12}$, $R^{13}$ and $R^{17}$ are i-propyl; and $R^1$, $R^2$, $R^3$, $R^4$, $R^5$, $R^{10}$, $R^8$, $R^{10}$, $R^{13}$, $R^{15}$ and $R^{16}$ are hydrogen, and $R^9$, $R^{11}$, $R^{14}$ and $R^{16}$ are trifluoromethyl.

In the polymerization processes described herein, it can be seen from the results that it is preferred that there be at least some steric crowding caused by the tridentate ligand about the Co or Fe atom. Therefore, it is preferred that groups close to the metal atom be relatively large. It is relatively simple to control steric crowding if (III) is the tridentate ligand, since control of steric crowding can be achieved simply by controlling the size of $R^8$, $R^{12}$, $R^{13}$ and $R^{16}$. These groups may also be part of fused ring systems, such as 9-anthracenyl.

In the first polymerization process it is preferred that X is chloride, bromide and tetrafluoroborate. It is also preferred that M is Fe[II] or Fe[III].

In the first polymerization process described herein an iron or cobalt complex (II) is contacted with ethylene, an α-olefin and a neutral Lewis acid W capable of abstracting $X^-$, hydride or alkyl from (II) to form a weakly coordinating anion, and must alkylate or be capable of adding a hydride ion to the metal atom, or an additional alkylating agent or an agent capable of adding a hydride anion to the metal atom must be present. The neutral Lewis acid is originally uncharged (i.e., not ionic). Suitable neutral Lewis acids include $SbF_5$, $Ar_3B$ (wherein Ar is aryl), and $BF_3$. Suitable cationic Lewis acids or Bronsted acids include NaBAF, silver trifluoromethanesulfonate, $HBF_4$, or $[C_6H_5N(CH_3)_2]^+$ $[B(C_6F_5)_4]^-$. In those instances in which (II) (and similar catalysts which require the presence of a neutral Lewis acid or a cationic Lewis or Bronsted acid), does not contain an alkyl or hydride group already bonded to the metal atom, the neutral Lewis acid or a cationic Lewis or Bronsted acid also alkylates or adds a hydride to the metal or a separate alkylating or hydriding agent is present, i.e., causes an alkyl group or hydride to become bonded to the metal atom.

It is preferred that $R^{20}$ contains 1 to 4 carbon atoms, and more preferred that $R^{20}$ is methyl or ethyl.

For instance, alkyl aluminum compounds (see next paragraph) may alkylate (II). However, not all alkyl aluminum compounds may be strong enough Lewis acids to abstract $X^-$ or an alkyl group from the metal atom. In that case a separate Lewis acid strong enough to do the abstraction must be present.

A preferred neutral Lewis acid, which can alkylate the metal, is a selected alkyl aluminum compound, such as $R^{19}_3Al$, $R^{19}AlCl_2$, $R^{19}_2AlCl$, and "$R^{19}AlO$" (alkylaluminoxanes), wherein $R^{19}$ is alkyl containing 1 to 25 carbon atoms, preferably 1 to 4 carbon atoms. Suitable alkyl aluminum compounds include methylaluminoxane (which is an oligomer with the general formula $[MeAlO]_n$), $(C_2H_5)_2AlCl$, $C_2H_5AlCl_2$, and $[(CH_3)_2CHCH_2]_3Al$.

Metal hydrides such as $NaBH_4$ may be used to bond hydride groups to the metal M.

In the second polymerization process described herein a cobalt or iron complex of (I) is either added to the polymerization process or formed in situ in the process. In fact, more than one such complex may be formed during the course of the process, for instance formation of an initial complex and then reaction of that complex to form a living ended polymer containing such a complex.

Examples of such complexes which may be formed initially in situ include:

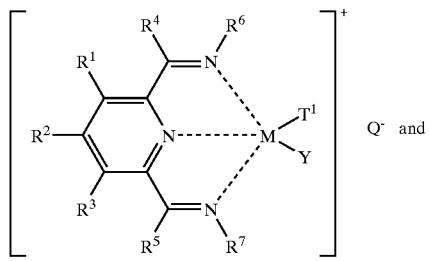

(VII)

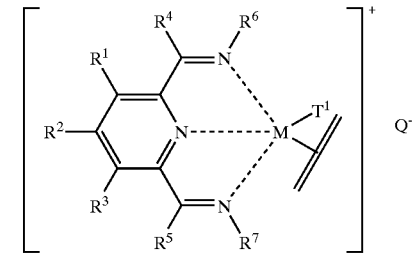

(XII)

wherein $R^1$ through $R^7$, and M are as defined above, $T^1$ is hydride or alkyl or any other anionic ligand into which ethylene or an α-olefin can insert, Y is a neutral ligand capable of being displaced by ethylene, propylene or an α-olefin, or a vacant coordination site, the "parallel lines" are an ethylene molecule coordinated to the metal, and Q is a relatively non-coordinating anion. Complexes may be added directly to the process or formed in situ. For instance, (VII) may be formed by the reaction of (II) with a neutral Lewis acid such as an alkyl aluminum compound. Another method of forming such a complex in situ is adding a suitable iron or cobalt compound such as iron [II] acetylacetonate, (I) and an alkyl aluminum compound. Other metal salts in which anions similar to acetylacetonate are present, and which may be removed by reaction with the Lewis or Bronsted acid. For instance metal halides and carboxylates (such as acetates) may be used, particularly if they are slightly soluble in the process medium. It is preferred that these precursor metal salts be at least somewhat soluble in the process medium.

After the polymerization has started, the complex may be in a form such as:

(IX)

wherein $R^1$ through $R^7$, M, and Q are as defined above, and P is a divalent polymeric groups containing repeat units derived from ethylene and/or propylene and/or an α-olefin, and $T^2$ is an end group, for example the groups listed for $T^1$ above. Those skilled in the art will note that (IX) is in essence a polymer containing a so-called living end. It is preferred that M be in +2 oxidation state in (VII), (VIII) and (IX). Compounds such as (VII), (IX) and (XII) may or may not be stable away from an environment similar to that of the polymerization process, but they may be detected by NMR spectroscopy, particularly one or both of $^1$H and $^{13}$C NMR, and particularly at lower temperatures. Such techniques, especially for polymerization "intermediates" of these types are known, see for instance World patent application Ser. No. 96/23010, especially Examples 197–203, which is hereby included by reference.

(VII), (IX) and (XII) may also be used, in the absence of any "co-catalysts" or "activators" to polymerize ethylene in a third polymerization process. Except for the ingredients in the process, the process conditions for the third process, such as temperature, pressure, polymerization medium, etc., may be the same as for the first and second polymerization processes, and preferred conditions for those processes are also preferred for the third polymerization process.

In all the polymerization processes herein, the temperature at which the ethylene copolymerization is carried out is about −100° C. to about +200° C., preferably about −60° C. to about 150° C., more preferably about −50° C. to about 100° C.

For copolymerization one or more α-olefins of the formula $H_2C{=}CHR^{21}$ may be used. It is preferred that $R^{21}$ have 1 to 18 carbon atoms, more preferably 2 to 8 carbon atoms, and/or that $R^{21}$ be n-alkyl. Since ethylene is polymerized considerably faster than propylene and most α-olefins by these catalysts, in order to obtain substantial incorporation of the α-olefin(s), the concentration of ethylene in the polymerization should preferably be relatively low compared to the concentration of the propylene and α-olefin(s). This will most often entail using ethylene at a low partial pressure, preferably less than 1.0 MPa, more preferably less than 500 kPa, and especially preferably less than 300 kPa (all these ethylene partial pressures are absolute partial pressures). If the α-olefin is a gas its partial pressure should preferably be relatively high. If the α-olefin is used in the liquid phase, its liquid concentration should preferably be relatively high.

NMR analysis of the product copolymers shows that the end groups are both saturated and unsaturated (olefinic), although saturated end groups usually outnumber unsaturated end groups. It is suspected that saturated end groups may arise through initiation and chain transfer involving alkyl aluminum compounds present in the polymerization. Unsaturated end groups are believed to arise though a β-hydride elimination-type mechanism. A small proportion of the olefinic ends appear to be internal olefins, but the majority of the olefinic ends are usually α-olefins (terminal olefins).

It is preferred that the product copolymer have at least 0.5 mole percent (total), more preferably 0.75 mole percent (total), especially preferably 1 mole percent (total), and highly preferably at least about 2 mole percent (total) of α-olefin(s) incorporated into the product copolymer. When 1-hexene is a comonomer the percent incorporated versus short chain branches, assuming all such branches are butyl, is shown in the following Table.

| Mole Percent 1-Hexene | n-Butyl Branches per 1000 C Atoms |
|---|---|
| 0.5 | 2.5 |
| 0.75 | 3.7 |
| 1.0 | 4.9 |
| 2.0 | 9.6 |
| 10.0 | 41.7 |

In copolymers of ethylene and $H_2C{=}CHR^{21}$ produced herein the polymer will contain —$R^{21}$ branches and methyl branches. The total amount of $H_2C{=}CHR^{21}$ is taken as the total of the —$R^{21}$ branches in the polymer, calculated according to a suitable formula, for example branches per 1000 carbon atoms or mole percent of $H_2C{=}CHR^{21}$ incorporated. It is believed that the methyl branches in the copolymer are associated with the end groups (but are not the end groups themselves). for example, end groups associated with methyl branches are ~~~~$CH_2CH(CH_3)CH_2CH_2CH_3$ and
~~~~$CH_2CH(CH_3)CH_2CH_2CH_2CH_3$ are the methyl branch associated groups for 1-pentene and 1-hexene respectively (and similar structures for higher and lower homologs), wherein "~~~~" is the remainder of the polymer chain. Such groups are detectable by $^{13}$C-NMR because methyl branches near the chain ends are somewhat different than methyl branches further in the interior of the polymer chain, see for instance the Examples herein. Note that the group beyond the methine carbon atom (towards the chain end) is actually —$R^{21}$. In other words the methyl branch is attached to the same carbon atom as an —$R^{21}$ group. Not all polymer chains have such chain ends, but usually at least some of them are present in these copolymers.

A preferred monomer combination is ethylene and one or more olefins of the formula $H_2C{=}CHR^{21}$.

During the polymerization process often some or most of the olefin comonomer $H_2C{=}CHR^{21}$ will be unused in the polymerization. Testing of this unused comonomer at the end of the polymerization process shows that it is usually essentially unaltered (not isomerized), so it may be recovered and recycled into the polymerization, if desired. This recycling may take place without purification, or the comonomer may be purified being recycled to the polymerization, as by distillation.

The polymerization processes herein may be run in the presence of various liquids, particularly aprotic organic liquids. The catalyst system, ethylene, propylene, α-olefin, and polyolefin may be soluble or insoluble in these liquids, but obviously these liquids should not prevent the polymerization from occurring. Suitable liquids include alkanes, cycloalkanes, selected halogenated hydrocarbons, and aromatic hydrocarbons. Specific useful solvents include hexane, toluene and benzene.

The copolymerizations herein may also initially be carried out in the solid state [assuming (II), (III) (IV) or (VII) is a solid] by, for instance, supporting (II), (III) (IV) or (VII) on a substrate such as silica or alumina or an organic substrate such as a polymer, activating it with the Lewis (such as W, for instance an alkylaluminum compound) or Bronsted acid and exposing it to an olefin. The support may also be able to take the place of the Lewis or Bronsted acid, for instance an acidic clay such as montmorillonite. Another method of making a supported catalyst is to start a polymerization or at least make an iron or cobalt complex of another olefin or oligomer of an olefin such as 1-hexene on a support such as silica or alumina. These "heterogeneous" catalysts may be used to catalyze polymerization in the gas phase or the liquid phase. By gas phase is meant that the monomers are transported to contact with the catalyst particle while they are in the gas phase.

Hydrogen may be used as a chain transfer agent in all of the polymerization processes described herein.

In all of the polymerization processes described herein oligomers and copolymers of ethylene and/or propylene are made. They may range in molecular weight from oligomers, to lower molecular weight oils and waxes, to higher molecular weight polyolefins. One preferred product is a polymer with a degree of polymerization (DP) of about 10 or more, preferably about 40 or more. By "DP" is meant the average number of repeat (monomer) units in a polymer molecule.

In the Examples, the pressures given are gauge pressures. Methods of NMR analysis for polymer branching, and the notation used herein to describe the branching as determined by $^{13}$C NMR, are found in U.S. Pat. No. 5,880,241 (equivalent of World patent application Ser. No. 96/23010), which is hereby included by reference. Syntheses of the diimine ligands and their Co and Fe complexes are found in B. L. Small, et al., J. Am. Chem. Soc., vol. 120, p. 4049–4050 (1998), and G. J. P. Britovsek, et al., J. Chem. Soc., Chem. Commun., p. 849–850 (1998), which are both hereby included by reference. The following abbreviations and terms are used:

DSC—differential scanning calorimetry
GC—gas chromatography
GPC—gel permeation chromatography
HOF—heat of fusion
IBAO-0.65—isobutylaluminoxane produced by the reaction of triisobutylaluminum with 0.65 equivalents of water
MMAO-3A—methylaluminoxane containing some isobutyl groups
Mn—number average molecular weight
MeOH—methanol
PMAO—polymethylaluminoxane
PMAO-IP—polymethylaluminoxane (Akzo, 12.8 weight percent aluminum in toluene)
PDI—weight average molecular weight divided by number average molecular weight (Mn)
TCB—1,2,4-trichlorobenzene
Tm—melting point

EXAMPLE 1

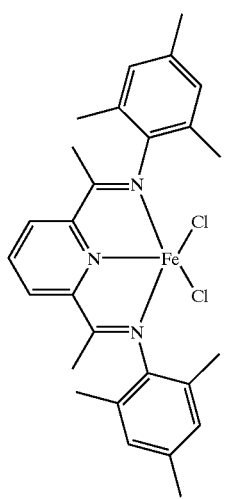

(XIII)

In a drybox under a nitrogen atmosphere, (XIII) (8 mg, 0.015 mmol) was weighed into a Schlenk flask and slurried in 20 ml anhydrous toluene. 1-Octene (3 ml, dried by distillation from sodium) was added and the Schlenk flask sealed and removed from the drybox. The flask was flushed well with ethylene and pressurized to 35 kPa. PMAO-IP (0.8 ml) was added and the solution turned orange and warmed. After 30 min the reaction was quenched by addition of MeOH. The solid polymer was filtered, washed well with MeOH/10% HCl, MeOH and finally acetone and dried under vacuum. Yield=2.7 g white polymer. DSC (10° C./min, N$_2$); Tm=123.2° C., shoulder on peak at 100° C. GPC (120° C., TCB); Mn=1500, PDI=5.6. The lowered (from pure polyethylene) melting point shows incorporation of comonomer.

EXAMPLE 2

In a drybox under a nitrogen atmosphere, (XIII) (7.5 mg, 0.014 mmol) was weighed into a Schlenk flask and slurried in 10 ml anhydrous toluene. 1-Hexene (3 ml, dried by distillation from sodium) was added and the Schlenk flask sealed and removed from the drybox. The flask was flushed well with ethylene and pressurized to 35 kPa. PMAO-IP (0.8 ml) was added and the solution turned green and warmed. After 30 min the reaction was quenched by addition of MeOH. The solid polymer was filtered, washed well with MeOH/10% HCl, MeOH and finally acetone and dried under vacuum. Yield=6.0 g white polymer. DSC (10° C./min, N$_2$); Tm=126.3° C., shoulder on low temperature side of peak. GPC (120° C., TCB); Mn=2420, PDI=8.0. $^{13}$C-NMR analysis indicated a total of 2.5 mol % 1-hexene incorporation. The branching was >75% butyl branches (1,2 or 2,1 incorporation). Amyl and methyl branches were also observed at low levels. No ethyl or propyl branches were observed.

EXAMPLE 3

In a drybox under a nitrogen atmosphere, (XIII) (2.0 mg) was weighed into a flask and slurried in 35 ml 1-hexene (Aldrich, 99+%, filtered through Al$_2$O$_3$ and stored over activated molecular sieves). The flask was stoppered and removed from the drybox. PMAO-IP (1.0 ml) was added to 5 ml anhydrous toluene and placed in a vial and removed from the drybox. The 1-hexene slurry was placed in a 100 ml Parr® stirred autoclave under an atmosphere of nitrogen. Stirring was started and the reactor heated to 50° C. The PMAO solution was then added to the reactor with 140 kPa ethylene. After 10 min the reaction was quenched by addition of MeOH. The solid polymer was filtered, washed well with MeOH/10% HCl, MeOH and finally acetone and dried under vacuum. Yield=7.8 g white polymer. DSC (10° C./min., N$_2$); Tm=102.0° C. with aminor peak at 112.0° C. GPC (120° C., trichlorobenzene); Mn=2534, PDI=2.3. $^{13}$C-NMR analysis (5 weight percent in TCB, 120° C.) indicated a total of 3.9 mol % 1-hexene incorporation. Of this most resulted in butyl branches (1,2 or 2,1 incorporation). Trace amounts of amyl and methyl branches were also observed. No ethyl or propyl branches were observed. The observed NMR is given below together with the assignments. The assignments of D, E and F are shown in the structure below, with "P" representing the rest of the polymer chain.

P~~~D(F)~~~
       |
       E

| Frequency | PPM | Height | Assignment |
|---|---|---|---|
| 3816.348 | 37.946 | 32.9 | $MB_4$ |
| 3716.490 | 36.954 | 2.0 | |
| 3498.618 | 34.787 | 4.3 | |
| 3455.364 | 34.357 | 67.6 | $\alpha\gamma^+B$ |
| 3415.848 | 33.964 | 36.4 | $4B_4$ |
| 3320.796 | 33.019 | 2.7 | D |
| 3224.143 | 32.058 | 10.8 | $3B_{6+}$, 3EOC |
| 3052.729 | 30.354 | 75.6 | $\gamma\gamma^+B$ |
| 3004.669 | 29.876 | 1417.0 | $\gamma^+\gamma^+B$ |
| 2953.405 | 29.366 | 50.9 | $3B_4$ |
| 2728.058 | 27.125 | 67.0 | $\beta\gamma^+B$ |
| 2340.374 | 23.271 | 37.6 | $2B_4$ |
| 2290.178 | 22.772 | 10.1 | $2B_{5+}$, 2EOC |
| 1994.877 | 19.835 | 2.3 | E |
| 1412.818 | 14.048 | 40.1 | $1B_{4+}$, 1EOC |

EXAMPLE 4

In a drybox under a nitrogen atmosphere, (XIII) (6.1 mg, 0.011 mmol) was weighed into a Schlenk flask and slurried in 10 ml anhydrous toluene. 1-Hexene (5 ml, dried by distillation from sodium) and anhydrous toluene (15 ml) were added and the Schlenk flask sealed and removed from the drybox. The flask was cooled to 0° C. and then flushed well with ethylene and pressurized to 35 kPa. PMAO-IP (0.9 ml) was added and the solution turned green and warmed. After 30 min the reaction was quenched by addition of MeOH. The solid polymer was filtered, washed well with MeOH/10% HCl, MeOH and finally acetone and dried under vacuum. Yield=2.7 g white polymer. DSC (10° C./min, $N_2$); Tm=127.6° C., shoulder on low temperature side of peak. GPC (120° C., trichlorobenzene); Mn=2120, PDI=19.1. $^{13}$C-NMR analysis indicated a total of 1.2 mol % 1-hexene incorporation. Only methyl and butyl branches were observed (1,2 or 2,1 incorporation).

Comparative Example A

In a drybox under a nitrogen atmosphere, (XIII) (7.5 mg, 0.014 mmol) was weighed into a Schlenk flask and slurried in 10 ml anhydrous toluene. Anhydrous toluene (30 ml) was added and the Schlenk sealed and removed from the drybox. The flask was cooled to 0° C. and then flushed well with ethylene and pressurized to 35 kPa. PMAO-IP (0.9 ml) was added and the solution turned orange and warmed. After 30 min the reaction was quenched by addition of MeOH. The solid polymer was filtered, washed well with MeOH/10% HCl, MeOH and finally acetone and dried under vacuum. Yield=1.9 g white polymer. DSC (10° C./min, $N_2$); Tm=132.7° C. GPC (120° C., trichlorobenzene); Mn=2900, PDI=19.1.

EXAMPLE 5

In a drybox under nitrogen, (XIII) (1.8 mg) was placed in 1-hexene (25 ml, Aldrich 99+%, filtered through activated $Al_2O_3$ and stored over activated molecular sieves) in a Hoke cylinder and sealed. PMAO-IP (0.9 ml) was placed in 2 ml anhydrous toluene in a vial and sealed. The containers were removed from the drybox. The 1-hexene slurry was placed in a Parr® stirred autoclave. Ethylene (70 kPa) was added, stirring started and the mixture heated to 75° C. The PMAO-IP solution was added to the reactor with an additional 160 kPa ethylene. After 81 min the reaction was quenched by addition of MeOH. The solid polymer was filtered, washed well with MeOH/10% HCl, MeOH and finally acetone and dried under vacuum. Yield=1.61 g white polymer. DSC (10° C./min., $N_2$); Tm($2^{nd}$ heat)=115.5° C. GPC (135° C., TCB); Mn=1090, PDI=1.8. $^{13}$C-NMR analysis indicated a total of 1.4 mol % 1-hexene incorporation. The observed number of short chain branches per 1000 $CH_2$ groups were methyl 1.9, butyl 7.1 and amyl 1.4.

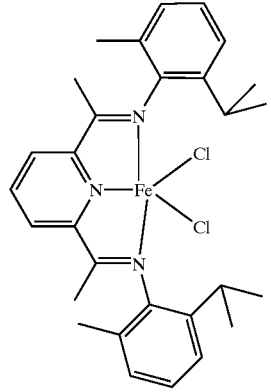

(XIV)

EXAMPLE 6

In a drybox under nitrogen, (XIV) (6.0 mg) was placed in a Schlenk flask and anhydrous toluene (5 ml) and 1-hexene (10 ml, Aldrich 99+%, filtered through activated $Al_2O_3$ and stored over activated molecular sieves) added. The flask was sealed and removed from the drybox. The flask was flushed with ethylene and PMAO-IP (0.9 ml) added. After 30 min the reaction was quenched by addition of MeOH/10% HCl. The solid polymer was filtered, washed well with MeOH/10% HCl, MeOH and-finally acetone and dried under vacuum. Yield=2.43 g white polymer. DSC (10° C./min., $N_2$); Tm($2^{nd}$ heat)=123.1° C., 109.2° C. (broad). GPC (135° C., TCB); Mn=1620, PDI=8.4. $^{13}$C-NMR analysis indicated a total of 2.1 mol % 1-hexene incorporation. The observed number of short chain branches per 1000 $CH_2$ groups were methyl 0.8, butyl 10.5 and amyl 1.5.

EXAMPLE 7

In a drybox under nitrogen, (XIII) (3.0 mg) was placed in a Schlenk flask and anhydrous toluene (5 ml) and 1-hexene (10 ml, Aldrich 99+%, filtered through activated $Al_2O_3$ and stored over activated molecular sieves) added. The flask was sealed and removed from the drybox. The flask was flushed with ethylene and MMAO-3A (0.45 ml, Akzo, 6.42 wt % Al in heptane) added. After 30 min the reaction was quenched by addition of MeOH/10% HCl. The solid polymer was filtered, washed well with MeOH/10% HCl, MeOH and finally acetone and dried under vacuum. Yield=1.1 g white polymer. DSC (10° C./min., $N_2$); Tm($2^{nd}$ heat)=121.0° C., ~80° C. (broad). GPC (135° C., TCB); Mn=1507, PDI=6.6. $^{13}$C-NMR analysis indicated a total of 6.4 mol % 1-hexene incorporation. The observed number of short chain branches per 1000 $CH_2$ groups was methyl 1.9 butyl 30.5 and amyl 0.5. In addition, isobutyl ends are observed on the polymer (from the MMAO activator), and in this instance the isobutyl ends are not included in the methyl branch total.

EXAMPLE 8

In a drybox under nitrogen, (XIII) (6.3 mg) was placed in a Schlenk flask and anhydrous toluene (5 ml) and 1-heptene (10 ml, distilled from Na) added. The flask was sealed and removed from the drybox. The flask was flushed with ethylene and PMAO-IP (0.9 ml) added. After 30 min the reaction was quenched by addition of MeOH/10% HCl. The solid polymer was filtered, washed well with MeOH/10% HCl, MeOH and finally acetone and dried under vacuum. Yield=0.87 g white polymer. DSC (10° C./min., $N_2$); Tm($2^{nd}$ heat)=122.3° C. GPC (135° C., TCB); Mn=2680, PDI=5.9. $^{13}$C-NMR analysis (10 weight percent in TCB, 120° C.) indicated a total of 5.3 mol % 1-heptene incorporation. The observed number of short chain branches per 1000 $CH_2$ groups were methyl 2.3, and amyl 24.6. The observed NMR is given below together with the assignments. The assignments of D, E and F are shown in the structure below, with "P" representing the rest of the polymer chain.

| Frequency | PPM | Height | Assignment |
|---|---|---|---|
| 3857.777 | 38.358 | 8.4 | |
| 3820.931 | 37.992 | 58.6 | $MB_{4+}$ |
| 3750.443 | 37.291 | 7.4 | F |
| 3622.817 | 36.022 | 3.5 | |
| 3502.133 | 34.822 | 10.8 | |
| 3455.675 | 34.360 | 132.6 | $\alpha B_{3+}$ |
| 3398.004 | 33.787 | 4.6 | |
| 3323.778 | 33.049 | 4.9 | D |
| 3274.116 | 32.555 | 81.1 | $3B_5$ |
| 3223.386 | 32.051 | 18.3 | $3B_{6+}$, 3EOC |
| 3142.218 | 31.243 | 7.9 | |
| 3080.808 | 30.633 | 30.3 | |
| 3051.438 | 30.341 | 108.0 | $\gamma\gamma^+B$ |
| 3003.378 | 29.863 | 2327.2 | $\gamma^+\gamma B$ |
| 2961.192 | 29.444 | 43.1 | |
| 2776.429 | 27.606 | 8.3 | |
| 2727.835 | 27.123 | 106.6 | $\beta\gamma^+B$ |
| 2688.319 | 26.730 | 74.4 | $4B_5$ |
| 2449.621 | 24.357 | 4.8 | |
| 2289.422 | 22.764 | 98.3 | $2B_{5+}$, 2EOC |
| 1994.654 | 19.833 | 4.8 | E |
| 1408.323 | 14.003 | 95.4 | $1B_{4+}$, 1EOC |

Comparative Example B

In a drybox under nitrogen, (XIII) (6.3 mg) was placed in a Schlenk flask and anhydrous toluene (15 ml added. The flask was sealed and removed from the drybox. The flask was flushed with ethylene and PMAO-IP (0.9 ml) added. After 30 min the reaction was quenched by addition of MeOH/10% HCl. The solid polymer was filtered, washed well with MeOH/10% HCl, MeOH and finally acetone and dried under vacuum. Yield=1.1 g white polymer. DSC (10° C./min., $N_2$); Tm($2^{nd}$ heat)=127.2° C. GPC (135° C., TCB); Mn=1220, PDI=9.0. No branching was observed in the $^{13}$C-NMR analysis.

EXAMPLE 9

In a drybox under nitrogen, (XIV) (6.0 mg) was placed in a Schlenk flask and anhydrous toluene (5 ml) and 1-heptene (10 ml, distilled from Na) added. The flask was sealed and removed from the drybox. The flask was flushed with ethylene and PMAO-IP (0.9 ml) added. After 30 min the reaction was quenched by addition of MeOH/10% HCl. The solid polymer was filtered, washed well with MeOH/10% HCl, MeOH and finally acetone and dried under vacuum. Yield=0.95 g white polymer DSC (10° C./min., $N_2$); Tm($2^{nd}$ heat)=123.4° C., 110.6° C. GPC (135° C., trichlorobenzene); Mn=2540, PDI=5.3. $^{13}$C-NMR analysis indicated a total of 3.0 mol % 1-heptene incorporation. The observed number of short chain branches per 1000 $CH_2$ groups were methyl 0.7, and amyl 14.4.

Comparative Example C

In a drybox under nitrogen, (XIV) (6.0 mg) was placed in a Schlenk flask and anhydrous toluene (15 ml) added. The flask was sealed and removed from the drybox. The flask was flushed with ethylene and PMAO-IP (0.9 ml) added. After 30 min the reaction was quenched by addition of MeOH/10% HCl. The solid polymer was filtered, washed well with MeOH/10% HCl, MeOH and finally acetone and dried under vacuum. DSC (10° C./min., $N_2$); Tm($2^{nd}$ heat) 131.2° C. GPC (135° C., TCB); Mn=1410, PDI=20.0. No branching was observed in the $^{13}$C-NMR analysis.

EXAMPLE 10

In a drybox under nitrogen, (XIII) (6.1 mg) was placed in a Schlenk flask and anhydrous toluene (5 ml) and 1-pentene (10 ml, filtered through activated $Al_2O_3$ and stored over activated molecular sieves) added. The flask was sealed and removed from the drybox. The flask was flushed with ethylene and PMAO-IP (0.9 ml) added. After 30 min the reaction was quenched by addition of MeOH/10% HCl. The solid polymer was filtered, washed well with MeOH/10% HCl, MeOH and finally acetone and dried under vacuum. Yield=0.82 g white polymer. DSC (10° C./min., $N_2$); Tm($2^{nd}$ heat)=117.8° C., ~90° C. (broad). GPC (135° C., TCB); Mn=1028, PDI=3.8. $^{13}$C-NMR analysis indicated a total of 10.0 mol % 1-pentene incorporation. The observed number of short chain branches per 1000 $CH_2$ groups were methyl 6.3, and propyl 50.9. GC analysis of the supernatant indicated negligible isomerization of the unreacted 1-pentene.

EXAMPLE 11

In a drybox under nitrogen, (XIII) (1.4 mg) was placed in ~6 ml anhydrous toluene in a vial. 1-Pentene (30 ml, filtered through activated $Al_2O_3$ and stored over activated molecular sieves), anhydrous toluene (5 ml) and PMAO (0.5 ml, Akzo, 10.9 wt % Al in toluene) was placed in a Hoke cylinder and sealed. The containers were removed from the drybox. The 1-pentene slurry was placed in a 100 ml Parr® stirred autoclave. Ethylene (41 kPa) was added and stirring started. The catalyst solution was added to the reactor with an additional 10 psi ethylene. After 12 min the reaction was quenched by addition of MeOH. The solid polymer was filtered, washed well with MeOH/10% HCl, MeOH and finally acetone and dried under vacuum. Yield=1.6 g white polymer. DSC (10° C./min., $N_2$); Tm($2^{nd}$ heat)=123.6° C. $^{13}$C-NMR analysis indicated a total of 0.8 mol % 1-pentene incorporation.

EXAMPLE 12

In a drybox under nitrogen, (XIII) (3.0 mg) was placed in a Schlenk flask and anhydrous toluene (5 ml) and 1-pentene (10 ml, filtered through activated $Al_2O_3$ and stored over activated molecular sieves) added. The flask was sealed and removed from the drybox. The flask was flushed with ethylene and MMAO-3A (0.45 ml, Akzo, 6.42 wt % Al in heptane) added. After 30 min the reaction was quenched by addition of MeOH/10% HCl. The solid polymer was filtered, washed well with MeOH/10% HCl, MeOH and finally acetone and dried under vacuum. Yield=1.9 g white polymer. DSC (10° C./min., N$_2$); Tm(2$^{nd}$ heat)=128.0° C. GPC (135° C., TCB); Mn=1716, PDI=7.0. $^{13}$C-NMR analysis (10 weight percent in TCB, 120° C.) indicated a total of 4.5 mol % 1-pentene incorporation. The observed number of short chain branches per 1000 CH$_2$ groups were methyl 2.4, propyl 21.7, and amyl 0.4. Any isopropyl or isobutyl end groups present due to initiator are not counted in the methyl group total. The observed NMR is given below together with the assignments. The assignments of A, B, C, D, E and F are shown in the structure below, with "P" representing the rest of the polymer chain.

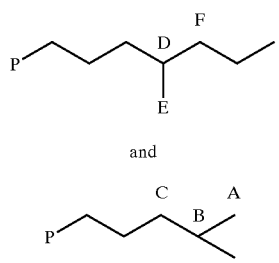

| Frequency | PPM | Height | Assignment |
|---|---|---|---|
| 3990.433 | 39.677 | 6.8 | F |
| 3950.917 | 39.284 | 7.1 | C |
| 3829.166 | 38.074 | 5.9 | |
| 3792.320 | 37.708 | 53.3 | MB$_{3+}$ |
| 3752.270 | 37.309 | 8.0 | |
| 3696.200 | 36.752 | 58.8 | 3B$_3$ |
| 3497.018 | 34.771 | 9.4 | |
| 3451.628 | 34.320 | 105.7 | αγ$^+$B |
| 3398.228 | 33.789 | 5.0 | |
| 3293.031 | 32.743 | 7.2 | 2B$_5$, D |
| 3222.543 | 32.042 | 21.0 | 3B$_{6+}$, 3EOC |
| 3139.773 | 31.219 | 6.5 | |
| 3050.061 | 30.327 | 120.9 | γγ$^+$B |
| 3002.535 | 29.855 | 2288.8 | γ$^+$γ$^+$B |
| 2960.883 | 29.440 | 56.7 | |
| 2823.646 | 28.076 | 8.6 | B |
| 2763.838 | 27.481 | 12.4 | |
| 2724.856 | 27.094 | 104.6 | βγ$^+$B |
| 2442.904 | 24.290 | 2.4 | |
| 2288.578 | 22.756 | 22.5 | 2B$_{5+}$, 2EOC |
| 2276.297 | 22.634 | 17.2 | A |
| 2029.055 | 20.175 | 63.0 | 2B$_3$ |
| 1987.937 | 19.766 | 8.0 | E |
| 1459.812 | 14.515 | 60.5 | 1B$_3$ |
| 1407.480 | 13.995 | 21.1 | 1B$_{4+}$, 1EOC |

EXAMPLE 13

In a drybox under nitrogen, (XIII) (3.0 mg) was placed in a Schlenk flask and anhydrous toluene (5 ml) and 1-pentene (10 ml, filtered through activated Al$_2$O$_3$ and stored over activated molecular sieves) added. The flask was sealed and removed from the drybox. The flask was flushed with ethylene and AlEt$_3$ (0.3 ml, 0.1M solution in toluene/hexane) and B(C$_6$F$_5$)$_3$ (0.0146 g in 0.5 ml toluene) were added. After 30 min the reaction was quenched by addition of MeOH/10% HCl. The solid polymer was filtered, washed well with MeCH/10% HCl, MeOH and finally acetone and dried under vacuum. Yield=0.21 g white polymer. DSC (10° C./min., N$_2$); Tm(2$^{nd}$ heat)=127.6° C. $^{13}$C-NMR analysis indicated a total of 0.64 mol % 1-pentene incorporation.

EXAMPLE 14

In a drybox under nitrogen, (XIII) (3.0 mg) was placed in a Schlenk flask and anhydrous toluene (5 ml) and 1-pentene (10 ml, filtered through activated Al$_2$O$_3$ and stored over activated molecular sieves) added. The flask-was sealed and removed from the drybox. The flask was flushed with ethylene and IBAO-0.65 (0.45 ml, Akzo, 3.5 wt % Al in toluene) added. After 90 min the reaction was quenched by addition of MeOH/10% HCl. The solid polymer was filtered, washed well with MeOH/10% HCl, MeOH and finally acetone and dried under vacuum. DSC (10° C./min., N$_2$); Tm(2$^{nd}$ heat)=115.5° C. (bimodal). GPC (135° C., TCB); Mn=1957, PDI=8.9. $^{13}$C-NMR analysis (10 weight percent in TCB, 140° C.) indicated a total of 8.2 mol % 1-pentene incorporation. The observed number of short chain branches per 1000 CH$_2$ groups were methyl 3.4, and propyl 39.0. (amyl not integrated due to overlap). Any isopropyl or isobutyl end groups present due to initiator are not counted in the methyl group total. The assignments of A, B, C, D, E and F are shown in the structure below, with "P" representing the rest of the polymer chain.

| Frequency | PPM | Height | Assignment |
|---|---|---|---|
| 3991.407 | 39.687 | 10.5 | F |
| 3951.357 | 39.289 | 8.9 | C |
| 3840.285 | 38.184 | 15.2 | |
| 3802.371 | 37.807 | 179.7 | MB$_{3+}$ |
| 3753.243 | 37.319 | 16.2 | |
| 3706.251 | 36.852 | 200.4 | 3B$_3$ |
| 3577.023 | 35.567 | 5.4 | |
| 3509.740 | 34.898 | 27.2 | |
| 3462.214 | 34.425 | 345.1 | αγ$^+$B |
| 3391.192 | 33.719 | 7.8 | |
| 3295.606 | 32.769 | 9.8 | D |
| 3271.576 | 32.530 | 8.2 | 3B$_5$ |
| 3218.710 | 32.004 | 21.9 | 3B$_{6+}$, 3EOC |
| 3159.970 | 31.420 | 15.7 | |
| 3084.142 | 30.666 | 35.7 | |
| 3047.296 | 30.300 | 320.8 | γγ$^+$B |
| 2998.168 | 29.811 | 3551.0 | γ$^+$γ$^+$B |
| 2954.915 | 29.381 | 64.8 | |
| 2822.483 | 28.064 | 10.4 | B |
| 2777.093 | 27.613 | 16.5 | |
| 2727.965 | 27.125 | 337.0 | αγ$^+$B |
| 2565.629 | 25.510 | 3.9 | |
| 2455.091 | 24.411 | 13.7 | |
| 2282.076 | 22.691 | 24.5 | 2B$_{5+}$, 2EOC |
| 2270.862 | 22.579 | 23.9 | A |
| 2029.494 | 20.180 | 216.3 | 2B$_3$ |
| 1986.774 | 19.755 | 13.3 | E |
| 1451.173 | 14.429 | 206.8 | 1B$_3$ |
| 1397.239 | 13.893 | 24.1 | 1B$_{4+}$, 1EOC |
| 1355.054 | 13.473 | 6.7 | |

Note: Existence of Me branches implies that these do not arise from the activator.

EXAMPLE 15

In a drybox under nitrogen, (XIII) (4.5 mg) was placed in a Schlenk flask and anhydrous toluene (5 ml) and 4-methyl-1-pentene (10 ml, filtered through activated $Al_2O_3$ and stored over activated molecular sieves) added. The flask was sealed and removed from the drybox. The flask was flushed with ethylene and PMAO-IP (0.9 ml) added. After 30 min the reaction was quenched by addition of MeOH/10% HCl. The solid polymer was filtered, washed well with MeOH/10% HCl, MeOH and finally acetone and dried under vacuum. Yield=4.65 g white polymer. DSC (10° C./min., $N_2$); Tm($2^{nd}$ heat)=121.4° C., 100.6° C. (broad). GPC (135° C., TCB); Mn=1740, PDI=5.0. $^{13}$C-NMR analysis indicated a total of 4.1 mol % 4-methyl-1-pentene incorporation.

EXAMPLE 16

In a dry box under nitrogen atmosphere, the iron complex 2,6-diacetylpyridinebis(2,4,6-trimethylphenylimine)iron dichloride (1.5 mg, 2.86 μmol) was weighed into a vial and diluted to 10 ml with toluene (Aldrich, Anhydrous 99.8%). An aliquot of 3 ml containing 0.45 mg (0.86 μmol) of catalyst was transferred to the injector vessel with 50 ml of toluene. To a second vessel, 100 ml of $CaH_2$ purified 1-octene (Aldrich, 98%) was mixed with 2 ml of MMAO-3A (Akzo Nobel). These solutions were transferred by pressure to a 600 ml Parr® autoclave reactor. The polymerization temperature was 120° C. and the ethylene pressure was 860 kPa, adjusted by a pressure regulator. The polymerization was run for 30 min. The reaction was quenched with methanol. The solid polymer was filtered and washed with acetone. Yield=2.68 g, DSC (10° C./min): Tm=126.2° C., HOF=212 J/g.

EXAMPLE 17

In a dry box under nitrogen atmosphere, an aliquot of 3 ml from the same stock solution of Example 16 was diluted with 50 ml of toluene and transferred to the injector vessel. To the second vessel, 80 ml of $CaH_2$ purified 1-octene (Aldrich, 98%) was mixed with 2 ml of MMAO-3A (Akzo Nobel). These solutions were transferred by pressure to a 600 Parr® autoclave reactor. The polymerization temperature was 60° C. and the ethylene pressure was 860 kPa, adjusted by a pressure regulator. The polymerization was run for 30 min. The reaction was quenched with methanol. The solid polymer was filtered, washed with acetone, and dried under vacuum. Yield=38.9 g, OSC (10° C./min): Tm=132.7° C., HOF=226 J/g.

EXAMPLE 18

In a dry box under nitrogen atmosphere, the iron complex [2,6-diacetylpyridinebis{(3,5-trifluoromethyl) phenylimine}] iron dichloride was weighed (6 mg, 9.7 μmol) and diluted to 100 ml of toluene (Aldrich, anhydrous, 99.8%) and spiked with 20 drops of methylene chloride (Aldrich). To this solution, 5.6 ml of MMAO-3A (Akzo Nobel) was added. This catalyst solution was transferred via cannula to a feed vessel of a catalyst pump. The pumping rate was constant for 15 min, resulting in 3.8 mg of catalyst used. For the comonomer, 85 ml of $CaH_2$ purified 1-hexene (Aldrich, 99%) was transferred to the reactor through a feed vessel. A 500 ml Zipperclave® reactor was charged with 165 ml of hexane (Aldrich, anhydrous, 95%+). The polymerization was run at 50° C. and 1.01 MPa of ethylene pressure. After 30 min, the reaction was quenched with methanol. The solid polymer was filtered, washed with acetone and dried under vacuum. Yield=1.4 g, DSC (10° C./min): Tm=126.6° C., with a shoulder at about 118° C. HOF=194 J/g. GPC Mw=11345, PDI=7.44.

Comparative Example

Example 18 above was repeated with the same iron complex solution available in the catalyst pump feed vessel. No comonomer was added to this example. The catalyst pumping rate was constant for the first 15 min of the run, resulting in 2.3 mg of catalyst used. A 500 ml Zipperclave® reactor was charged with 250 ml of hexane (Aldrich, anhydrous, 95%). The polymerization was run at 50° C. and 1.01 MPa of ethylene pressure. After 30 min, the reaction was quenched with methanol. The solid polymer was filtered, washed with acetone and dried under vacuum. Yield=3.4 g, DSC (10° C./min): Tm=130.3° C., HOF=278 J/g. Mw=14434, PDI=6.03

What is claimed is:

1. A polymerization process, comprising, contacting, at a temperature of about −100° C. to about +200° C., a compound of the formula:

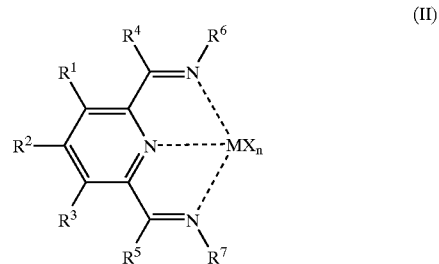

(II)

with ethylene, an α-olefin of the formula $H_2C{=}CHR^{21}$, and:
   (a) a first compound W, which is a neutral Lewis acid capable of abstracting $X^−$ and alkyl group or a hydride group from M to form $WX^−$, $WR^{20}$ or WH and which is also capable of transferring an alkyl group or a hydride to M, provided that $WX^−$ is a weakly coordinating anion; or
   (b) a combination of a second compound which is capable of transferring an alkyl or hydride group to M and a third compound which is a neutral Lewis acid which is capable of abstracting $X^−$, a hydride or an alkyl group from M to form a weakly coordinating anion;
wherein:
   M is Co or Fe;
   each X is an anion;
   n is 1, 2 or 3 so that the total number of negative charges on said anion or anions is equal to the oxidation state of a Fe or Co atom present in (II);
   $R^1$, $R^2$ and $R^3$ are each independently hydrogen, hydrocarbyl, substituted hydrocarbyl, or an inert functional group;
   $R^4$ and $R^5$ are each independently hydrogen, hydrocarbyl, an inert functional group, or substituted hydrocarbyl;
   $R^6$ and $R^7$ are aryl or substituted aryl;
   $R^{20}$ is alkyl; and
   $R^{21}$ is alkyl.

2. A polymerization process, comprising contacting, at a temperature of about −100° C. to about +200° C., a Co[II], Co[III], Fe[II] or Fe[III] complex of a tridentate ligand of the formula:

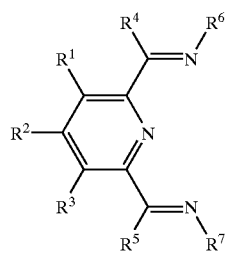
(I)

with ethylene, and an α-olefin of the formula $H_2C{=}CHR^{21}$, wherein:

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl;

$R^6$ and $R^7$ are aryl or substituted aryl; and $R^{21}$ is alkyl;

and provided that a Co[II], Co[III], Fe[II] or Fe[III] atom also has bonded to it an empty coordination site or a ligand that may be displaced by said ethylene, and a ligand that may add to said ethylene.

3. The process as recited in claim 2 wherein:

$R^6$ is:

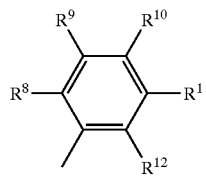
(XI);

$R^7$ is:

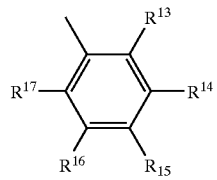
(XI);

$R^8$ and $R^{13}$ are each independently hydrogen, hydrocarbyl, substituted hydrocarbyl or an inert functional group;

$R^9$, $R^{10}$, $R^{11}$, $R^{14}$, $R^{15}$ and $R^{16}$ are each independently hydrogen, hydrocarbyl, substituted hydrocarbyl or an inert functional group;

$R^{12}$ and $R^{17}$ are independently hydrogen, hydrocarbyl, substituted hydrocarbyl or an inert functional group;

and provided that any two of $R^8$, $R^9$, $R^{10}$, $R^{11}$, $R^{12}$, $R^{13}$, $R^{14}$, $R^{15}$, $R^{16}$ and $R^{17}$ that are vicinal to one another, taken together may form a ring.

4. The process as recited in claim 3 wherein:

$R^1$, $R^2$ and $R^3$ are hydrogen;

$R^9$, $R^{10}$, $R^{11}$, $R^{14}$, $R^{15}$ and $R^{16}$ is each independently halogen, alkyl containing 1 to 6 carbon atoms, or hydrogen;

$R^8$ and $R^{13}$ is each independently halogen, phenyl or alkyl containing 1 to 6 carbon atoms;

$R^{12}$ and $R^{17}$ is each independently halogen, phenyl, hydrogen, or alkyl containing 1 to 6 carbon atoms; and $R^4$ and $R^5$ are each independently hydrogen or alkyl containing 1 to 6 carbon atoms.

5. The process as recited in claim 4 wherein $R^4$ and $R^5$ are each hydrogen or methyl.

6. The process as recited in claim 1 wherein X is chloride, bromide or tetrafluoroborate.

7. The process as recited in claim 1 wherein said neutral Lewis acid is an alkyl aluminum compound.

8. The process as recited in claim 7 wherein said alkyl aluminum compound is polymethylaluminoxane.

9. The process as recited in claim 4 wherein said temperature is about −50° C. to about 100° C.

10. The process as recited in claim 1 wherein M is Fe.

11. The process as recited in claim 2 wherein said complex is an Fe[II] or Fe[III] complex.

12. The process as recited in claims 1, 2, 10 or 11 wherein $R^{21}$ is n-alkyl.

13. A polymerization process, comprising, contacting, at a temperature of about −100° C. to about +200° C., ethylene, an α-olefin of the formula $H_2C{=}CHR^{21}$, and a compound of the formula:

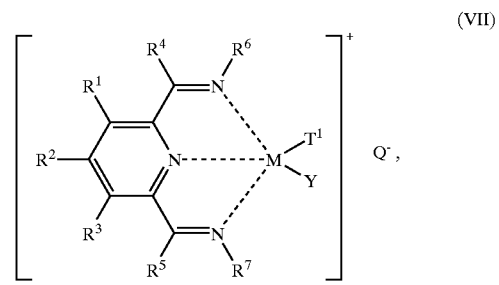
(VII)

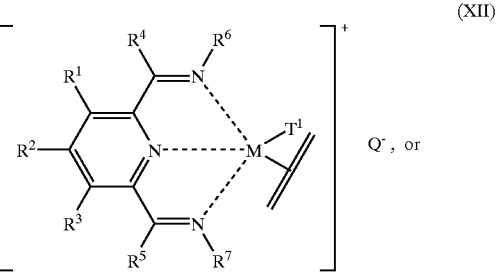
(XII)

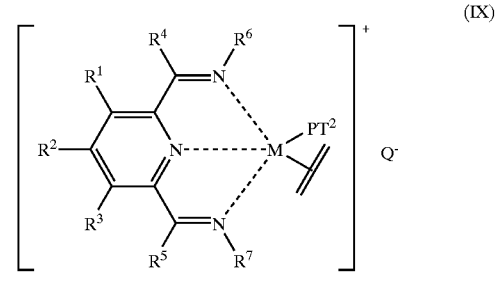
(IX)

wherein:

M is Co or Fe;

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl;

$R^6$ and $R^7$ are aryl or substituted aryl;

$R^{21}$ is alkyl;

$T^1$ is hydride or alkyl or any other anionic ligand into which ethylene or an α-olefin can insert;

Y is a neutral ligand capable of being displaced by ethylene or a vacant coordination site;

Q is a relatively non-coordinating anion;

P is a divalent polyolefin group; and $T^2$ is an end group.

14. The process as recited in claim 13 wherein said compound is (VII).

15. The process as recited in claim 13 wherein said compound is (IX).

16. The process as recited in claim 13 wherein said compound is (XII).

17. The process as recited in claim 13 wherein:

$R^6$ is:

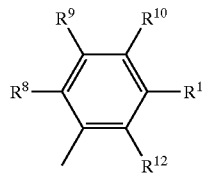

(XI);

-continued $R^7$ is:

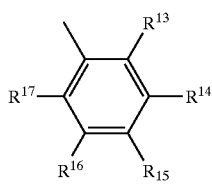

(XI);

$R^8$ and $R^{13}$ are each independently hydrogen, hydrocarbyl, substituted hydrocarbyl or an inert functional group;

$R^9$, $R^{10}$, $R^{11}$, $R^{14}$, $R^{15}$ and $R^{16}$ are each independently hydrogen, hydrocarbyl, substituted hydrocarbyl or an inert functional group;

$R^{12}$ and $R^{17}$ are each independently hydrogen, hydrocarbyl, substituted hydrocarbyl or an inert functional group;

and provided that any two of $R^8$, $R^9$, $R^{10}$, $R^{11}$, $R^{12}$, $R^{13}$, $R^{14}$, $R^{15}$, $R^{16}$ and $R^{17}$ that are vicinal to one another, taken together may form a ring.

18. The process as recited in claim 13 wherein said temperature is about −50° C. to about 100° C.

19. The process as recited in claim 13 wherein M is Fe.

20. The process as recited in claim 13 or 19 wherein $R^{21}$ is n-alkyl.

21. The process as recited in claims 1, 2 or 13 wherein said compound or complex is supported on a substrate.

22. The process as recited in claims 1, 2, 10, 13 or 19 wherein said process produces a copolymer having incorporated therein at least about 0.5 mole percent of said α-olefin.

* * * * *